Dec. 14, 1971  A. C. HOLMES  3,626,778
CENTERING MECHANISM FOR POWER TRANSMITTING MEANS
Filed July 23, 1970  2 Sheets-Sheet 1

INVENTOR:
ALVIN C. HOLMES
BY: James E. Nilles
ATTORNEY

Dec. 14, 1971  A. C. HOLMES  3,626,778
CENTERING MECHANISM FOR POWER TRANSMITTING MEANS
Filed July 23, 1970  2 Sheets-Sheet 2

INVENTOR:
ALVIN C. HOLMES
BY: James E. Nilles
ATTORNEY

United States Patent Office 3,626,778
Patented Dec. 14, 1971

3,626,778
CENTERING MECHANISM FOR POWER TRANSMITTING MEANS
Alvin Clifford Holmes, Racine, Wis., assignor to Twin Disc, Incorporated, Racine, Wis.
Filed July 23, 1970, Ser. No. 57,617
Int. Cl. F16h 55/18
U.S. Cl. 74—409                                8 Claims

ABSTRACT OF THE DISCLOSURE

Power transmitting means having a plurality of concentric driving parts which are connectible together by means of teeth or splines and between which the various clearances, tolerances, and eccentricities all contribute to result in an unbalance of the means. Satisfactory balancing of such means is virtually impossible when such means operate in both a driving relationship with one another and also under low or zero torque when they seek another position dependent on their individual internal unbalance. Centering means are provided between the concentric parts so as to keep the parts in a single and proper relationship to one another so as to reduce unbalance and/or permit balancing of the parts. The centering means comprises levers that are both centrifugally and spring loaded, and which urge the parts into proper and identical relationship with one another at zero or low torques and when they are operating under load.

BACKGROUND OF THE INVENTION

Rotating parts need to maintain relatively constant radial position to one another in order to be balanced and maintain that balance. Unfortunately, in power transmitting means, it is necessary to have a certain amount of clearance or sliding tolerances between the concentric and inter-engageable parts. These clearances in addition to tolerances, and eccentricities between the parts due to manufacturing or assembly variations, contribute together to create a considerable amount of unbalance in the power transmitting means. This unbalance is a serious problem and has limited the size, for one thing, of such power transmitting means. This unbalancing problem is particularly aggravated in larger size devices and where there is a considerable number of concentric driving parts. When the transmitting means is in full and normal driving engagement, the parts naturally assume a driving relationship with one another, but it is at the zero or low torque that the parts assume quite a different position. That the parts do not maintain a singular radial position makes the transmission means difficult if not impossible to be balanced, limiting operation of the means to slow speeds.

SUMMARY OF THE PRESENT INVENTION

The present invention provides a power transmitting means having concentric driving parts, and which means also has centering means between the parts for urging the parts into the same radial position whether they are static, rotating, at low torque or transmitting full design power. More specifically, the centering means comprises shiftable levers which are mounted and act between the concentric parts and which urge the parts into a constant radial position relative to one another.

The levers are designed to urge and hold these parts in the desired position in the varying gravity field resulting from rotation. Thus the invention includes the design aspect of these levers to utilize their centrifugal effects with the designed mechanical advantages of the levers to be equal to or in excess of the maximum probable unbalanced force of the parts they are centering.

Another more specific aspect of the invention relates to means for biasing these levers so as to provide for balancing the static forces of the parts, which are different forces from the centrifugal forces on the parts due to rotation.

These and other objects and advantages of the present invention will appear hereinafter as this disclosure progresses, reference being had to the accompanying drawings.

DESCRIPTION OF A PREFERRED EMBODIMENT

The invention is applicable to various types of power transmitting means such as gear couplings where the gears are always running engaged but may operate at low or zero torque where the parts move to another position. This new position is dependent on the internal unbalance of the individual parts. The invention has been shown for the purposes of illustration, however, as applied to a clutch means where it finds particular, but not exclusive utility.

For the sake of illustrating the invention, the invention has been shown as applied to a device which is similar to the clutch shown in the U.S. Pat. No. 3,161,270, which issued Dec. 15, 1964, and is entitled "Frictional and Positive Progressive Engagement Clutch." By way of general background, such a clutch mechanism includes a synchronizing friction clutch and a subsequently actuated gear coupling, and a pair of expansible pressure fluid chambers which are pressurized in timed relationship with one another whereby one chamber first causes engagement of the friction clutch and the other chamber causes slight slipping of the clutch and immediate engagement lock-up of the gear coupling.

In the devices of the above type, as in other power transmitting means, there are a plurality of concentric parts which are connected together by means of splines, gear teeth or the like and which because of the eccentricities, tolerances, and other necessary clearances, tend to shift unpredictably in radial position, particularly when operating at low torque or when not transmitting power. It is to devices of this type that the present invention is directed.

Figure 1:
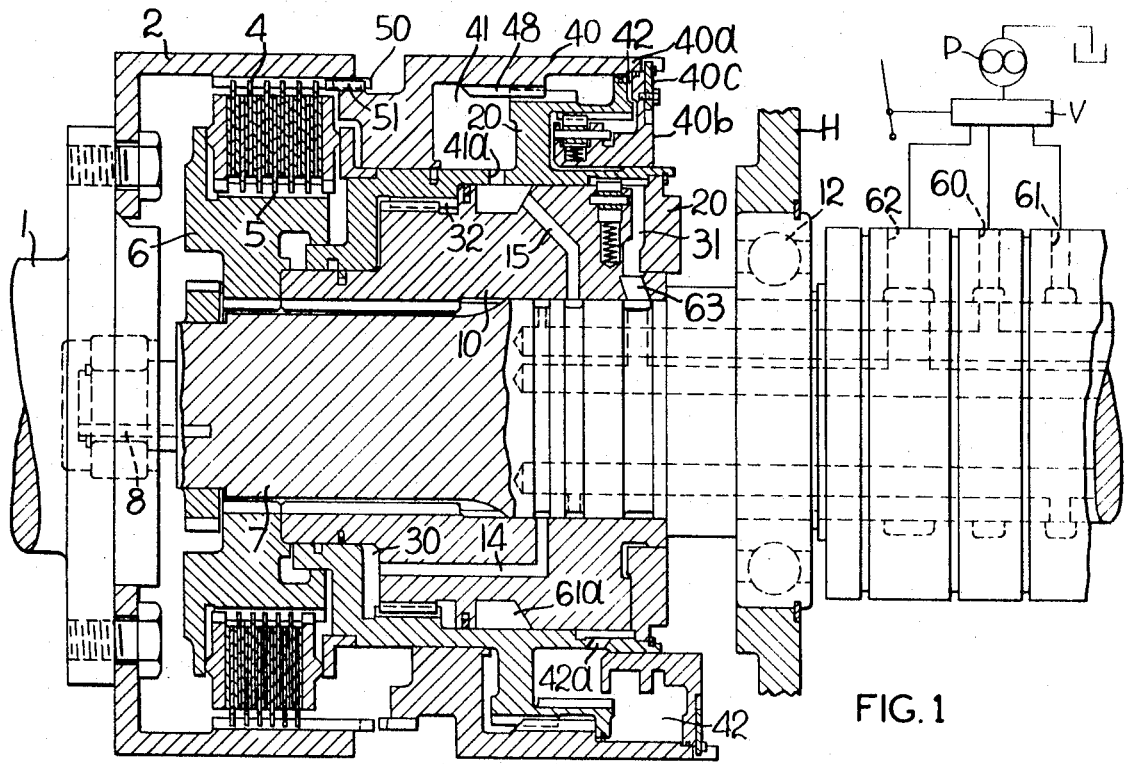
FIG. 1 is a longitudinal, cross sectional view through a power transmitting means embodying the present invention, the upper half of the view showing the parts shifted to different positions from that shown in the lower half of the figure.

Referring to FIG. 1 in greater detail, the power transmitting means includes an output member 1 which includes an output drum 2. Interleaved friction clutch plates 4 and 5 are axially splined respectively, to the output drum 2 and clutch hub and backplate assembly 6, whereby the clutch can be disengaged in the known manner. The assembly 6 is splined to the input shaft 7 for rotation therewith, and shaft 7 is in turn piloted at 8 in the output member 1.

A fluid passage sleeve 10 (FIG. 1), constituting an inner part, having fluid passages 14 and 15 is fixed to shaft 7 between the backplate assembly 6 and an antifriction bearing assembly 12. A piston 20, constituting an intermediate part, is slideably and sealingly mounted on member 10 and defines therewith a clutch actuating chamber 30 and a clutch releasing chamber 31. The piston 20 is axially splined to the sleeve 10 by the splines 32 to permit shifting axially in respect thereto and also rotates therewith.

An outer piston 40, constituting an outer part, is slideably and sealingly mounted around the inner piston 20 and defines therewith an actuating chamber 41 and a release chamber 42, both chambers 41 and 42 being of the expansible type and to which fluid is admitted by passage 41a and 42a (FIG. 2), respectively.

Outer piston 40 splined to inner piston 20 as by means of the splines 48 and thereby the pistons rotate together but can shift axially to one another. Briefly, pressurization of chamber 41 causes the outer piston to shift axially to the left (as viewed in the drawing) thereby causing engagement of teeth 50 and 51 located, respectively, on the outer piston 40 and the output drum 2.

A source of pressure fluid such as a fluid pump P, (FIG. 1) furnishes fluid via a control valve V, to passages 60, 61, and 62 in the mechanism.

Fluid passage 60 introduces the plate clutch apply pressure fluid to the chamber 30 via passage 14 in the sleeve 10. Passage 61 introduces gear coupling apply fluid to chamber fluid to chamber 41 via passage 15, annular chamber 61a and passage 41a. Passage 62 introduces fluid to the release chamber 31 via passage 63 and then to chamber 42 via passage 42a.

If a further description of the operation or structure of the clutch mechanism is deemed to be either necessary or desirable, reference may be had to the said U.S. Pat. 3,161,270. However, for the purpose of this present disclosure, it is believed sufficient to say that the power transmitting means includes the several concentric members 10, 20, and 40 which are engageable by their respective splines or teeth 32 and 48.

In accordance with the present invention, a centering device CD1 is provided between the members 20 and 40 and another centering device CD2 is provided between the concentric members 10 and 20.

Spline teeth between concentric members will dictate the alignment of their respective members when under substantial torque. However, due to the necessary tolerances, clearances, and other eccentricities between the parts, the spline teeth do not maintain the parts in the same radial position when the parts are not in driving relationship or when they are operating at low torque but instead they shift relative to one another in a direction of their individual internal unbalance.

Figure 4:
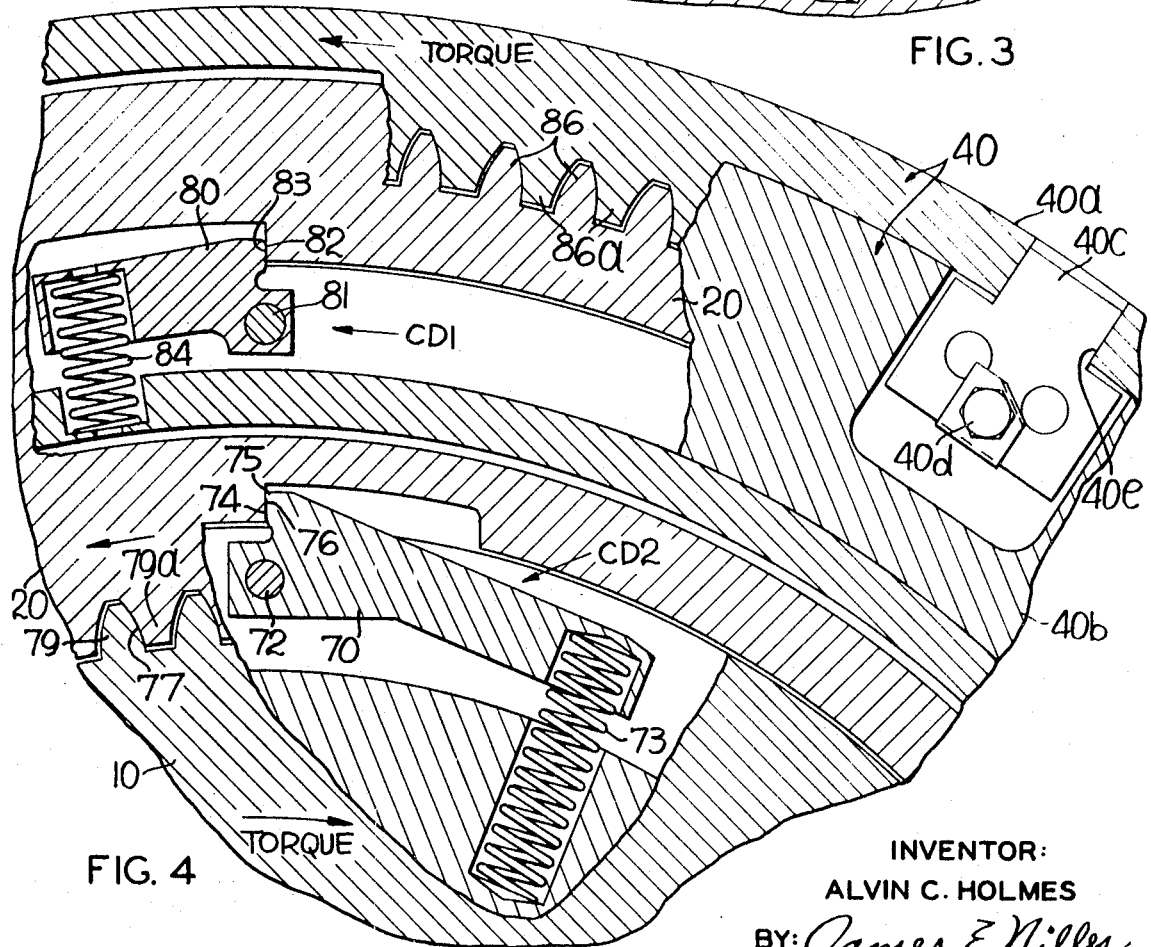
FIG. 4 is a view somewhat similar to FIG. 3, but also showing other parts in other sectional planes.

Referring first to the centering device CD1, one of these devices is shown in FIG. 4, but they must be used in pairs or several of them may be circumferentially spaced around and between the members 20 and 40 in order that they do not in themselves cause unbalance.

Referring to centering device CD1, it consists of swingable levers 80 which are pivoted on pin 81 located on member 40. Levers 80 have an actuating portion 82 that abuts against a shoulder 83 of the member 20. A spring 84 acts between lever 80 and member 40 and urges the nose or actuating portion 82 firmly against the concentric member 20 to urge the latter into tooth spline contact with member 40. More specifically, the teeth 86 and 86a of members 20 and 40, respectively, are urged into contact with one another in the same relative relationship as when they are under substantial driving torque. Levers 80 constitute a first set of shiftable levers.

The centrifugal force to be provided by centering device CD1 must be greater than the centrifugal force of the part that is to be centered, namely concentric member 40. The spring 84 of centering device CD1 is used for overcoming the static weight of member 40 as when the transmission means is operating at zero or low rotational speeds.

Centering device CD2 comprises swingable levers 70 which are pivoted adjacent one end on the pin 72 in member 10. Levers 70 constitute a second set of shiftable levers. More specifically, lever 70 has an engaging portion 74 with a rounded nose 75 which abuts against a shoulder 76 formed in member 20. Thus, the centering device CD2 urges the member 20 in the direction indicated by the curvilinear arrow relative to member 10 in FIG. 4, or more specifically urges the gear teeth into contact as at 77. The driving direction of member 10 is shown by the curvilinear arrow in FIG. 4 and thus, the teeth 79 and 79a of members 10 and 20, respectively, are held in the same relative relationship as when under substantial torque due to external load. It will be noted that lever 70 is of considerble length because it is located at a smaller diameter and thereby in lower centrifugal force field than the centering device CD1 and furthermore, this centering device CD2 must also overcome the maximum probable unbalance force of both outer, concentric parts 20 and 40. Also the larger weight, that of two parts 20 and 40, can be more easily supported by spring 73 with the relatively long moment arm between spring 73 and pin 72 of member 70.

Stated otherwise, centering device CDE need only provide for the weight and centrifugal force of member 40. The larger mass of both members 20 and 40 which are supported by centering device CD2, together with the location of device CD2 at a small diameter and thus in a reduced gravity field under rotation, requires centering device CD2 to be larger than centering device CD1.

The centering devices provided by the present invention maintain the concentric parts in the same radial position even at no load conditions or for low rotational speeds, and at the same time they permit axial motion between the parts so that the teeth slide without excess friction.

Figure 2:
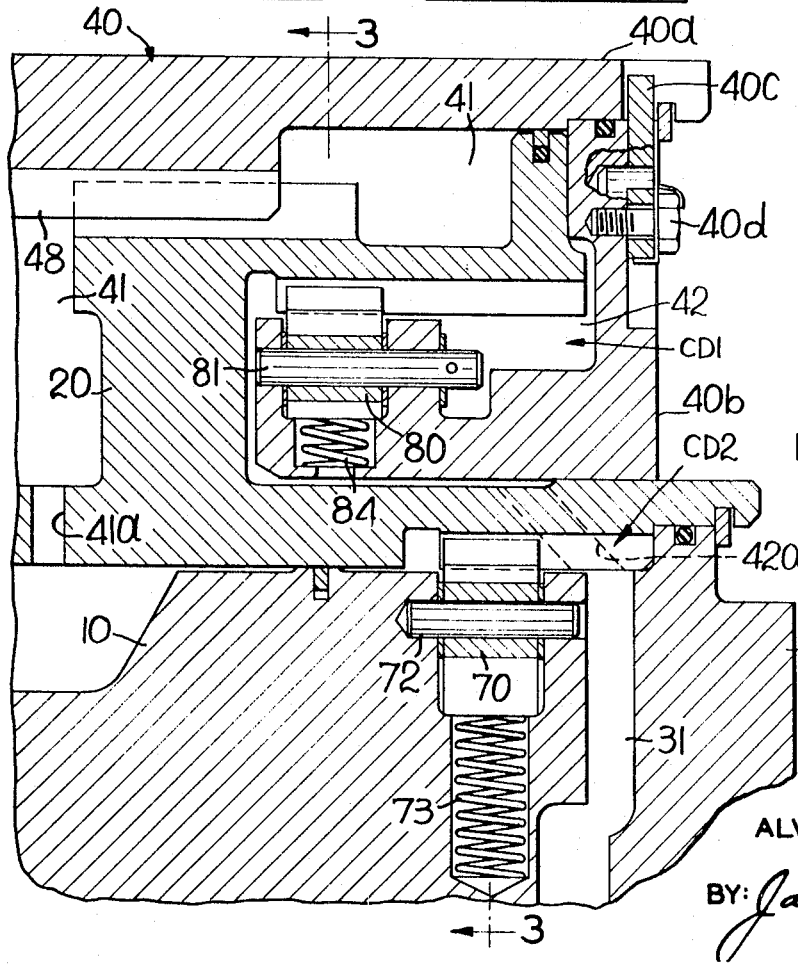
FIG. 2 is an enlarged, fragmentary view of a portion of the means shown in FIG. 1 and illustrating the centering means.
Figure 3:
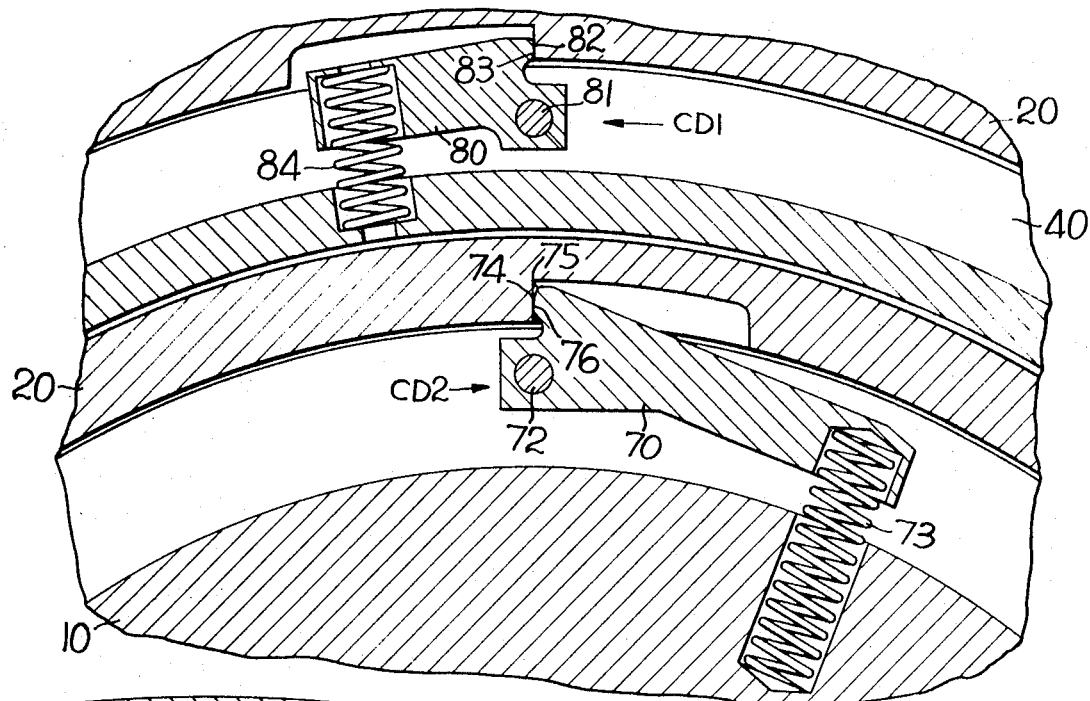
FIG. 3 is a sectional view taken along line 3—3 in FIG. 2.

Referring to FIGS. 2 and 4, the member 40 has been shown in two pieces 40a and 40b which are held together by a driving key 40c. The keys 40c are held by cap screws 40d on member 40b and also engage the slots 40e formed in member 40. This driving key arrangement is necessary in order to be able to assemble the parts, but members 40a and 40b may be considered as one member for purposes of this invention.

I claim:

1. Power transmitting means including generally concentric parts which have teeth like means for drivingly connecting said parts together, centering means acting between the parts for urging the parts into a predetermined radial position relative to one another, said centering means including shiftable levers pivotally mounted on one of said parts and abuttable against an adjacent part, said levers having a mass acted upon by centrifugal force to cause shifting of said centering means and consequently of said parts into said predetermined position.

2. Power transmitting means as defined in claim 1 including spring means acting on said levers to balance the static forces of the parts.

3. Power transmitting means as defined in claim 1 further characterized in that the weight and mechanical advantage of said levers equals or exceeds the maximum predetermined unbalance force on the parts they are centering.

4. Power transmitting means as defined in claim 2 further characterized in that the weight and mechanical advantage of said levers equals or exceeds the maximum predetermined unbalance force on the parts they are centering.

5. Power transmitting means including three generally concentric parts including inner, intermediate and outer parts which define two fluid actuating chambers therebetween, said parts having teeth like means for drivingly connecting said parts together, said parts also being axailly slidable relative to one another, centering means acting between the parts for urging the parts into a predetermined radial position relative to one another, said centering means including a first set of shiftable levers pivotally mounted on said outer part and abuttable against said intermediate part, said centering means also including a second set of shiftable levers pivotally mounted on said inner part and abuttable against said intermediate part, said second set of levers being located radially inwardly and of longer length than said first set, said levers having having a mass acted upon by centrifugal force to cause shifting of said centering means and consequently of said parts into said predetermined position.

6. Power transmitting means as defined in claim 5 including spring means acting on said levers to balance the static forces of the parts.

7. Power transmitting means as defined in claim 5 further characterized in that the weight and mechanical advantage of said levers equals or exceeds the maximum predetermined unbalance force on the parts they are centering.

8. Power transmitting means as defined in claim 6 further characterized in that the weight mechanical advantage of said levers equals or exceeds the maximum predetermined unbalance force on the parts they are centering.

References Cited
UNITED STATES PATENTS

| | | | |
|---|---|---|---|
| 3,037,396 | 6/1962 | Martin | 74—409 |
| 3,161,270 | 12/1964 | Aschauer | 192—53 |
| 3,359,819 | 12/1967 | Veillette et al. | 74—409 |

KENNETH W. SPRAGUE, Primary Examiner

U.S. Cl. X.R.

64—15 R; 192—53 R